United States Patent [19]

Eto et al.

[11] Patent Number: 4,773,498

[45] Date of Patent: Sep. 27, 1988

[54] ASSISTING POWER CONTROLLER FOR AN AUTOMOTIVE POWER STEERING DEVICE

[75] Inventors: Kunihiko Eto, Toyota; Yutaka Mori; Kazumasa Kodama, both of Okazaki, Japan

[73] Assignee: Toyoda Koki Kabushiki Kaisha, Kariya, Japan

[21] Appl. No.: 946,050

[22] Filed: Dec. 24, 1986

[30] Foreign Application Priority Data

Dec. 24, 1985 [JP] Japan .................. 60-296495

[51] Int. Cl.⁴ ............................................. B62D 5/06
[52] U.S. Cl. .................................... 180/79.1; 180/142
[58] Field of Search .............. 180/142, 143, 141, 79.1

[56] References Cited

U.S. PATENT DOCUMENTS

| | | | |
|---|---|---|---|
| 4,437,532 | 5/1984 | Nakamura et al. | 180/142 |
| 4,498,036 | 2/1985 | Salemka | 318/561 |
| 4,506,909 | 3/1985 | Nakashima et al. | 280/707 |
| 4,542,460 | 9/1985 | Weber | 364/424 |
| 4,574,905 | 3/1986 | Asano et al. | 180/142 |
| 4,593,358 | 6/1986 | Takeshima et al. | 364/424 |
| 4,602,695 | 7/1986 | Takeshima et al. | 180/143 |
| 4,626,994 | 12/1986 | Yabe et al. | 364/424 |
| 4,651,290 | 3/1987 | Masaki et al. | 364/550 |
| 4,662,466 | 5/1987 | Eto et al. | 180/142 |

FOREIGN PATENT DOCUMENTS 60-18455  1/1985  Japan .
60-255576 12/1985 Japan .
61-220971 10/1986 Japan .
61-257365 11/1986 Japan .
61-275060 12/1986 Japan .
61-275061 12/1986 Japan .

Primary Examiner—John J. Love
Assistant Examiner—Donn McGiehan
Attorney, Agent, or Firm—Oblon, Fisher, Spivak, McClelland & Maier

[57] ABSTRACT

An assisting power controller for a vehicle power steering device is provided with a microcomputer, which stores in a random access memory a plurality of the latest steering angle data each detected from a steering angle detector each time the vehicle runs a predetermined distance. The microprocessor processes the plurality of steering angle data to calculate a first driving index representing the road condition and then, to decide a first electric current meeting the road condition. The microprocessor also stores in the memory a plurality of the latest vehicle speed data each detected from a speed sensor each time the vehicle runs the predetermined distance. The microprocessor processes the plurality of vehicle speed data to calculate a second driving index representing the state of maneuver by the driver of the vehicle and then, to decide a second electric current meeting the state of maneuvering. The microprocessor thereafter makes an addition of the first and second electric currents and applies the added electric current to an electromagnetic flow control valve which controls the bypass communication of pressurized fluid between opposite chambers of a power cylinder, to control the assisting power generated by the power cylinder based on the road condition and the state of maneuvering by the driver of the vehicle.

14 Claims, 9 Drawing Sheets

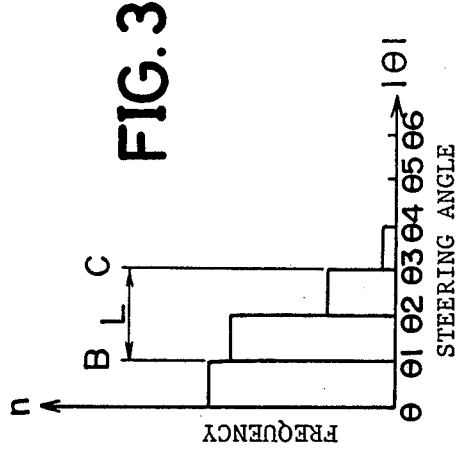
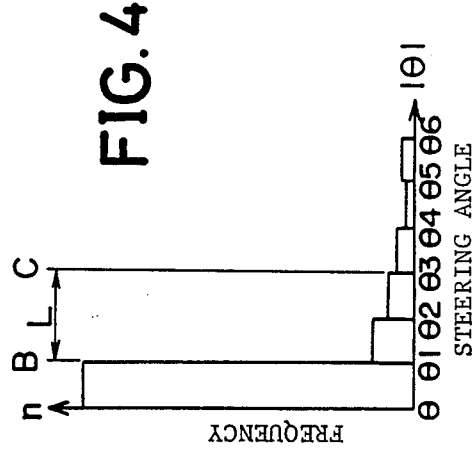
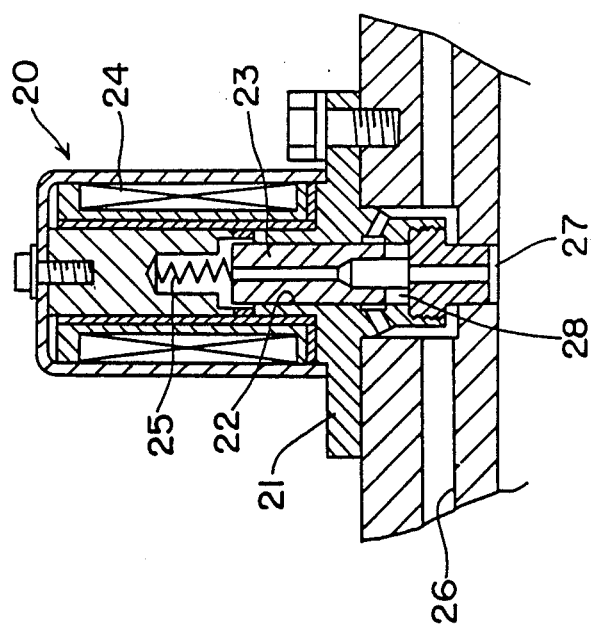

ASSISTING POWER CONTROLLER FOR AN AUTOMOTIVE POWER STEERING DEVICE

BACKGROUND OF THE INVENTION

1. Field of the Invention

The present invention relates to an assisting power controller for controlling the assisting power generated by a power steering device of a motor vehicle, in dependence upon the driving status of the motor vehicle.

2. Discussion of the Prior Art

In a known power steering system for a motor vehicle, the traveling speed of the motor vehicle is detected by a vehicle speed sensor, and the assisting power generated by a power steering device is controlled based on the detected vehicle speed in such a manner as to make a steering wheel light in a low speed range and heavy in a high speed range, for example.

However, the driving status of the motor vehicle varies depending on the road condition, namely on whether the vehicle is traveling on a town street or on a mountain road. Further, the vehicle driver often maneuvers the vehicle vigorously, impatiently or gently in his mood of the moment or in his personality. The known power steering system is not able to detect changes in the driving status caused by such various factors, so that there cannot be given an appropriate assisting power which meets any of such various driving statuses.

SUMMARY OF THE INVENTION

Accordingly, it is a primary object of the present invention to provide an improved assisting power controller for a power steering device capable of controlling the assisting power generated by the power steering device in dependence not only on the road condition but also on the state of maneuver by the driver of the vehicle.

Another object of the present invention is to provide an improved assisting power controller for a power steering device wherein the assisting power generated by the power steering device is determined taking into consideration the respective trends within a limited time of steering wheel turns and vehicle speed changes.

A further object of the present invention is to provide an improved assisting power controller for a vehicle power steering device of the character set forth above wherein a steering wheel is made heavier during rough or vigorous maneuver by the driver of the vehicle, while it is made lighter during gentle maneuver of the vehicle.

Briefly, an assisting power controller for a vehicle power steering device according to the present invention comprises a first calculation device for calculating a first driving index representing the road condition based on a plurality of steering angle signals sampled in turn from a steering angle detection device and a second calculation device for calculating a second driving index representing the state of maneuver by the operator of the vehicle based on a plurality of vehicle speed relating information sampled in turn from a speed relating information detection device. A control current decision device decides based on the first and second driving indexes a control current which is used to control the assisting power generated by the power steering device.

With this configuration, since the state of maneuver by the driver of the vehicle, in addition to the road condition, is taken into consideration in calculating the control current, the assisting power of the power steering device can be controlled to such an appropriate value as to meet the road condition and the state of maneuver by the driver of the vehicle.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment, wherein like reference numerals designate identical or corresponding parts throughout the several views, and in which:

FIG. 2 is a sectional view of an electromagnetic flow control valve attached to a power cylinder shown in FIG. 1;

FIG. 3 is a histogram showing frequencies at which a steering wheel of the motor vehicle is turned to respective angular intervals in mountain road driving;

FIG. 4 is another histogram showing frequencies at which the steering wheel is turned to the respective angular intervals in town street driving;

Figure 1:
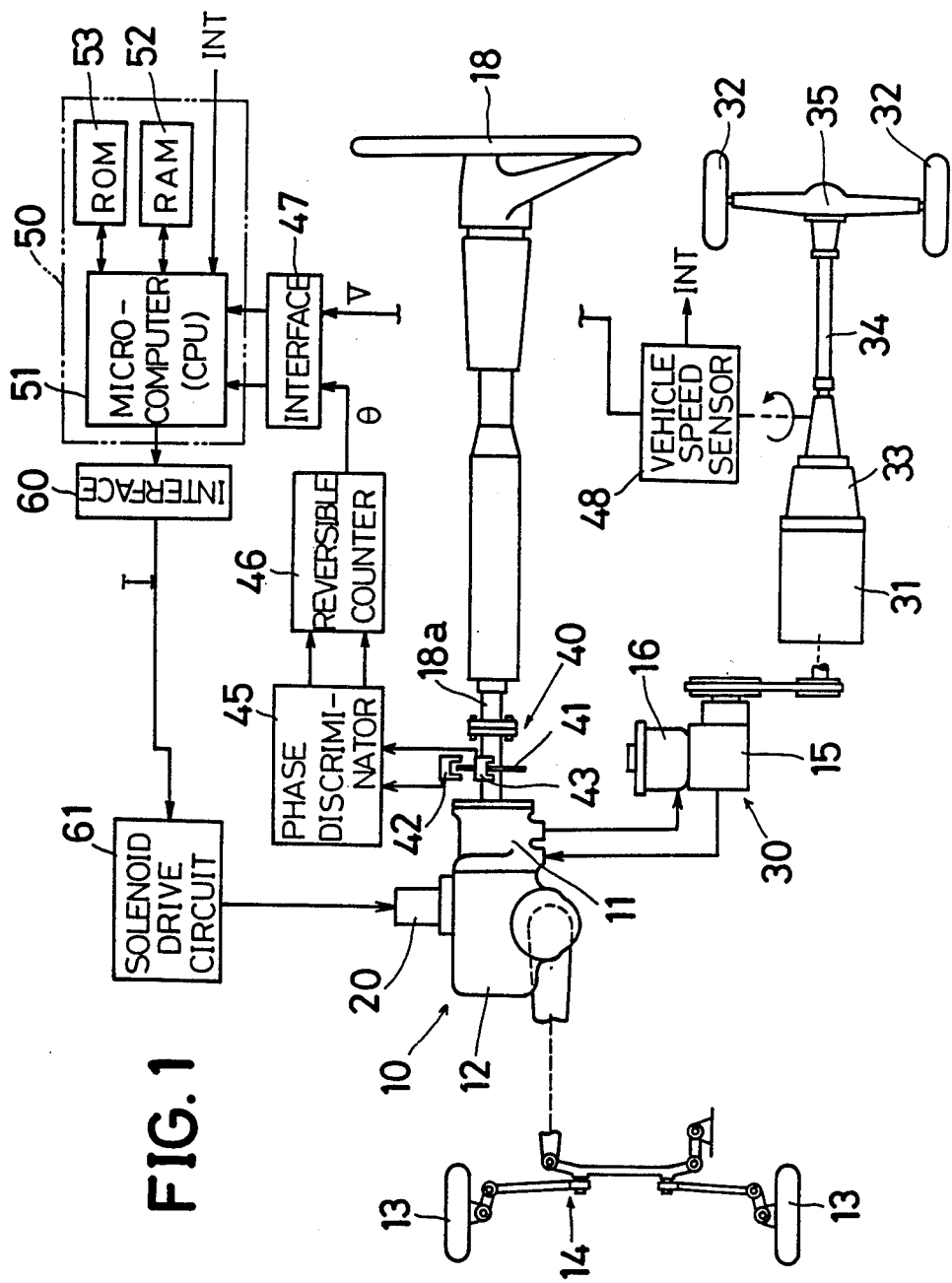
FIG. 1 is a block diagram of a power steering system incorporating an assisting power controller according to the present invention.
Figure 6:
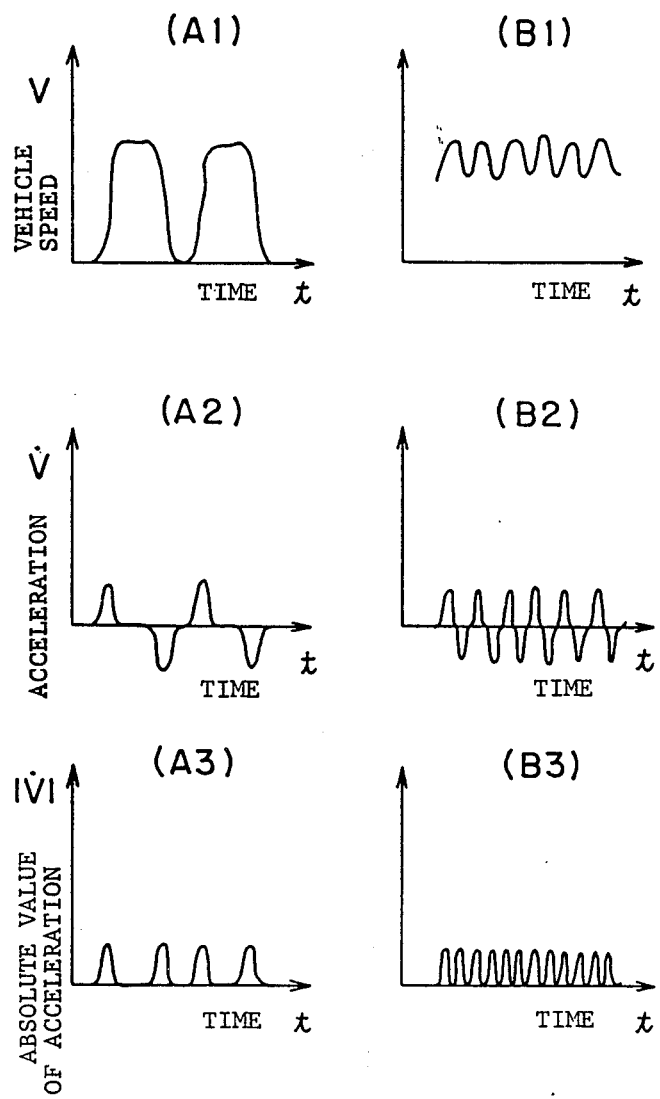
Figure 7:
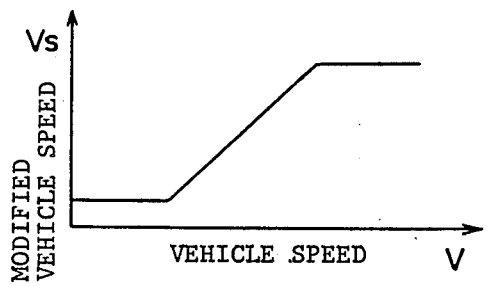
Figure 8:
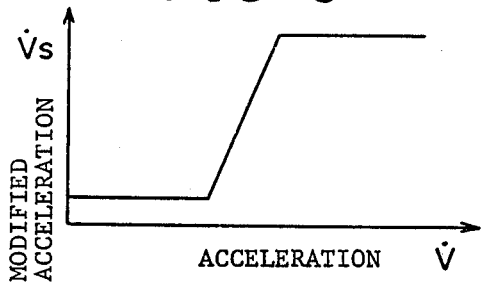
Figure 9:
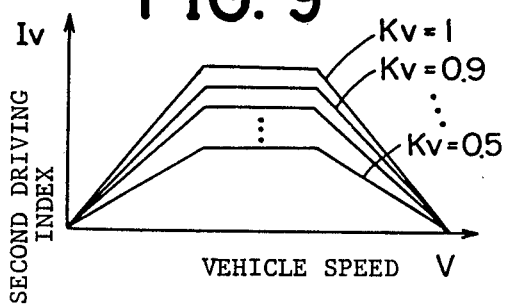
Figure 10:
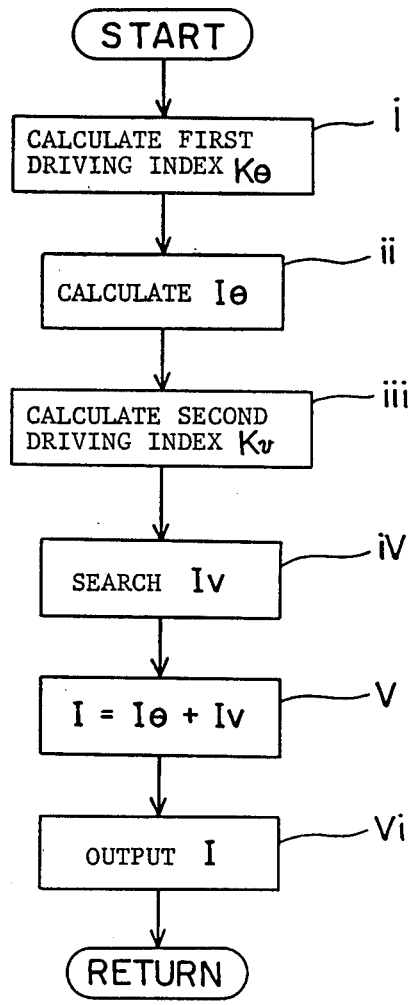
Figure 11:
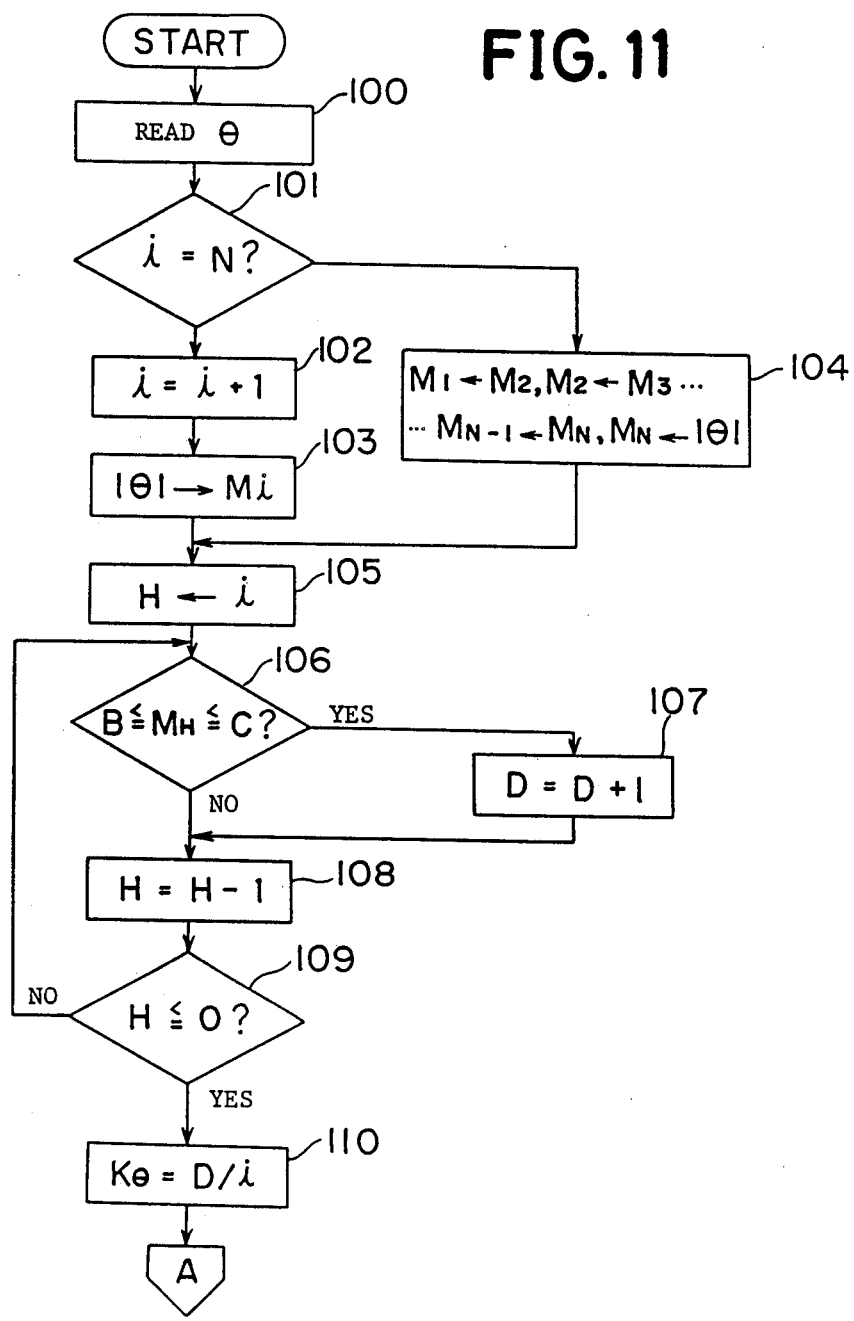
Figure 15:
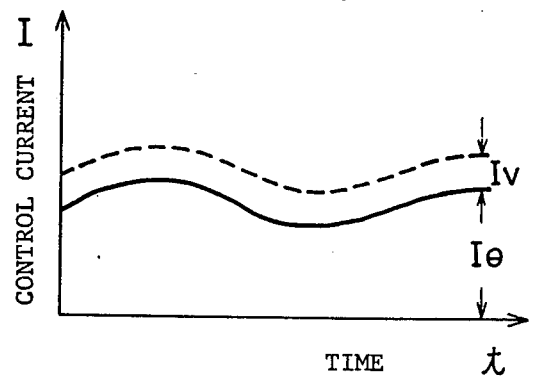
Figure 16:
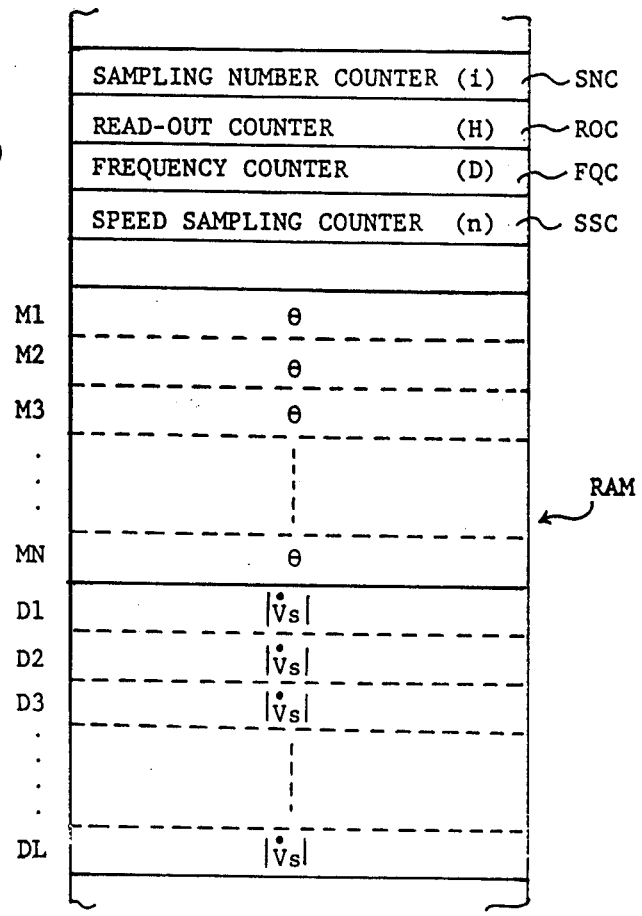

FIGS. 6(A1)–6(A3) and 6(B1)–6(B3) are graphs showing the variations in vehicle speed, acceleration and the absolute value of the acceleration in two different states of vehicle handling;

FIG. 7 is a graph showing a vehicle speed modification map;

FIG. 8 is a graph showing an acceleration modification map;

FIG. 9 is a graph showing control patterns selected to meet various statuses of vehicle handling;

FIG. 10 is a flow chart showing a system control program that a microprocessor shown in FIG. 1 executes in controlling the assisting power generated by the power cylinder;

FIGS. 11–14 are flow charts showing the details of the processings executed by the microprocessor respectively in steps i–iv of FIG. 10;

FIG. 15 is a graph showing the variation in control current applied to an electromagnetic flow control valve; and FIG. 16 is an explanatory view showing the storage area allocation of a random access memory shown in FIG. 1.

DETAILED DESCRIPTION OF THE PREFERRED EMBODIMENT

Referring now to the drawings and particularly to FIG. 1 thereof, a power steering system is illustrated having a power steering gear mechanism generally indicated at 10, a pump unit generally indicated at 30 and an assisting power controller generally indicated at 50 for controlling the assisting power generated by the steering gear mechanism 10.

The steering gear mechanism 10 is composed of a servovalve 11 and a power cylinder 12. The servovalve 11 is coupled to a steering wheel 18 through a steering shaft 18a, while the power cylinder 12 is coupled to a pair of steerable front wheels 13 through link mechanisms 14. As is well known in the art, when a manual steering torque is applied to the steering wheel 18, an output steering torque increased by the power cylinder 12 is transmitted to the steerable wheels 13. The servovalve 11 is supplied with pressurized fluid from a pump 15 of the pump unit 30 which is drivingly connected to an automotive engine 31. The rotational power of the engine 31 is transmitted to another pair of rear wheels 32 through a transmission 33, an output shaft 34, a differential gear mechanism 35 and the like.

An electromagnetic flow control valve 20 is provided for controlling the bypass fluid communication between opposite chambers of the power cylinder 12 which are selectively supplied with pressurized fluid from the pump 15 through the servovalve 11, so as to control the assisting power generated by the power cylinder 12. As shown in FIG. 2 in detail, the valve 20 comprises a spool 23, which is slidably received in a hole 22 of a valve body 21, and a solenoid 24. The spool 23 is normally held by a spring 25 at its lower stroke end to discontinue the communication of passages 26, 27 which respectively lead to the opposite chambers of the power cylinder 12. However, when the solenoid 24 is energized to attract the spool 23, the same is displaced upward against the force of the spring 25, so that the passages 26, 27 communicate with each other through a bypass slit 28 to decrease the assisting power generated by the power cylinder 12.

Referring back to FIG. 1, the assisting power controller 50 is primarily composed of a microcomputer (hereafter referred to as "CPU") 51, a random access memory (hereafter referred to as "RAM") 52, and a read-only memory (hereafter referred to as "ROM") 53. The CPU 51 is coupled through an interface 60 to a solenoid drive circuit 61 for controlling electric current (I) applied to the solenoid 24 of the flow control valve 20. The CPU 51 is also coupled to a steering angle sensor 40 through an interface 47, a reversible counter 46, and a phase discrimination circuit 45. The steering angle sensor 40 comprises a rotary disc 41 secured to the steering shaft 18a and two photo interrupters 42, 43 and detects the steering angle based upon the signals from the photo interrupters 42, 43. The reversible counter 46 stores the angular position of the steering wheel 18 by incrementing its content in response to each of right-turn pulses from the phase discrimination circuit 45 and decrementing its contents in response to each of left-turn pulses from the phase discrimination circuit 45.

Further, the CPU 51 is coupled through the interface 47 to a vehicle speed sensor 48, which is drivingly connected to the output shaft 34 for detecting the vehicle speed (V). For example, the speed sensor 48 may be composed of a pulse generator rotated by the output shaft 34, a counter responsive to pulses from the pulse generator and resettable at a predetermined time interval, and a register loaded with the value of the counter prior to each resetting operation of the counter. Data in the register represents the vehicle speed (V) input to the CPU 51 through the interface 47. The pulse generator is capable of generating an interrupt signal INT each time the vehicle runs a predetermined distance (e.g., 10 meters), so as to input the interrupt signal INT to the CPU 51.

Considering now the driving status of the vehicle, the factors which cause the driving status to change includes the road condition that is, whether the vehicle is traveling a mountain road or a town street, and a driving condition that is, whether the driver is maneuvering or handling the vehicle roughly or gently.

Each of FIGS. 3 and 4 shows the distribution of frequencies at which the steering wheel 18 was turned to respective angular intervals (e.g., 0-$\theta_1$, $\theta_1$-$\theta_2$, $\theta_2$-$\theta_3$, $\theta_3$-$\theta_4$, ... ). Mountain road driving represents a frequency distribution shown in FIG. 3 because of many curve turns and less right-angle turns, while town street driving represents another frequency distribution shown in FIG. 4 because of frequent straight drivings and relatively many right-angle turns at intersections. Accordingly, the road condition can be detected by calculating a first driving index (K$\theta$) which indicates the distribution or dispersion of the steering angle signals ($\theta$).

The ROM 53 has stored therein control programs for calculating the first driving index (K$\theta$) indicating the road condition and for calculating electric current which is to be applied to the electromagnetic valve 20 in dependence upon the index (K$\theta$).

As will be understood later, the first driving index (K$\theta$) obtained by the execution of the control programs becomes larger in the mountain road driving than in the town street driving.

Figure 5:
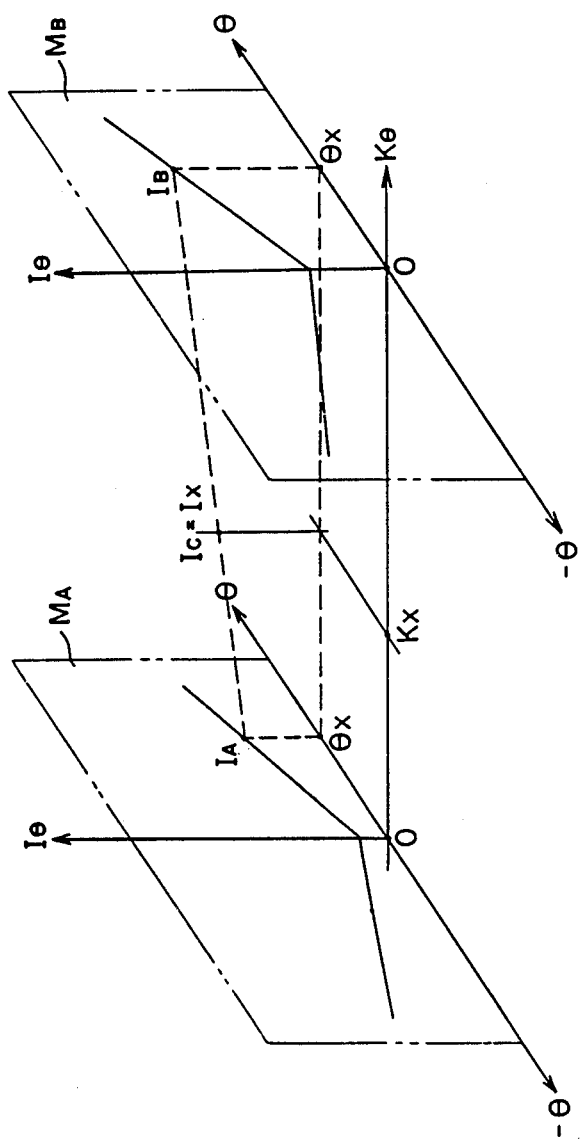
FIG. 5 is a graph showing control patterns of electric current selected based on the road condition.

Further, the ROM 53 has stored therein two kinds of control patterns in the form of characteristic maps. As shown in FIG. 5, the control patterns comprise a first control pattern MA for town street driving and a second control pattern MB for mountain road driving. The first control pattern MA represents the variation characteristic of electric current (I$\theta$), to be applied to the solenoid 24, relative to the steering angle ($\theta$). Similarly, the second control pattern MB represents another variation characteristic of electric current (I$\theta$), to be applied to the solenoid 24, relative to the steering angle ($\theta$). The variation characteristics of the electric currents (I$\theta$) are so determined that basically, the electric current (I$\theta$) becomes large as the steering angle ($\theta$) increases. However, the difference therebetween is in a point that the second control pattern MB for mountain road driving is higher in the level of electric current (I$\theta$) than the first control pattern MA for town street driving when the steering angle ($\theta$) is zero (i.e., the steering wheel 18 is at its neutral position) and that the second control pattern MB is larger in the variation rate of electric current (I$\theta$) relative to steering angle ($\theta$) than the first control pattern MA.

Thus, in town street driving according to the first control pattern MA, the variation in the required manual steering torque is made relatively small notwithstanding a large increase in the steering angle ($\theta$), thereby providing a steering characteristic suitable for town street driving in which a large angle turn of the steering wheel 18 is performed at a larger frequency. In mountain road driving according to the second control pattern MB, on the other hand, another steering characteristic is obtained wherein the steering wheel 18 is made generally heavier so as to prevent the steering wheel 18 from being turned excessively, and wherein the manual steering torque required therein increases at a larger rate with increases in the steering angle ($\theta$).

The driving status of the vehicle varies largely depending upon the status of maneuver or handling by the driver, as mentioned earlier. FIG. 6 shows the difference between two statuses of handling by the driver. In a driving status wherein a relatively gentle handling is performed, the frequency of acceleration and deceleration is small as shown in FIG. 6(A1). On the other hand, in another driving status wherein a rough or vigorous handling is performed, acceleration and deceleration are repeated at a large frequency as shown in FIG. 6(B1). Thus, the status of handling by the driver can be detected by calculating a second driving index (Kv) which is the cumulation of the acceleration and deceleration during a predetermined time. For this purpose, the ROM 53 has stored therein control programs for calculating the second driving index (Kv) indicative of the handling status based on the vehicle speed (V) and for calculating electric current (Iv) which corresponds to the index (Kv), to be applied to the electromagnetic valve 20.

Under the control of these programs, calculations are made first for an acceleration ($\dot{V}$) shown in FIGS. 6(A2) and 6(B2) and then, for the absolute value ($|\dot{V}|$) of the calculated acceleration ($\dot{V}$) as shown in FIGS. 6(A3) and 6(B3). This results in calculating the frequency of acceleration and deceleration which represents the second driving index (Kv).

In the illustrated embodiment, the vehicle speed (V) and the calculated acceleration ($\dot{V}$) are not used as they are in calculating electric current to be applied to the solenoid 24. That is, they are modified for a modified vehicle speed (Vs) and a modified acceleration ($\dot{V}s$), which are then used for calculation of the electric current.

The reasons for the calculation of the modified vehicle speed (Vs) are, for example, to prevent the second driving index (Kv) from increasing more than as required in traveling on highways and to prevent the second driving index (Kv) from becoming large in the case of a traffic stagnation on a town street wherein the frequency of acceleration and deceleration is generally few. Further, the reasons for calculation of the modified acceleration ($\dot{V}s$) are to make the second driving index (Kv) unresponsive to such changes that usual driving statuses make of acceleration at a low level, and to prevent the second driving index (Kv) from being extraordinarily rapidly increased upon a rapid change in acceleration which is caused by quick breaking or quick acceleration. By so doing, there can be obtained a second driving index (Kv) which is optimum and little in error. For the modification of vehicle speed (V) and the acceleration ($\dot{V}$), the ROM 53 has stored therein modification maps shown in FIGS. 7 and 8, according to which the vehicle speed (V) and the acceleration ($\dot{V}$) are modified to calculate the second driving index (Kv) correctly.

FIG. 7 shows a functional formula $Vs = f \cdot (V)$ for calculating a modified vehicle speed (Vs) from a vehicle speed (V). As is clear from the figure, the modified vehicle speed (Vs) is set to vary in proportion to the vehicle speed (V) in a medium speed range, but not to vary in either of low and high speed ranges. FIG. 8 shows another functional formula $\dot{V}s = f \cdot (\dot{V})$ for use in calculating a modified acceleration ($\dot{V}s$) from an acceleration ($\dot{V}$), and the modified acceleration ($\dot{V}s$) is set not to vary in either of low and high acceleration ranges. It is to be noted that the second driving index (Kv) calculated by the execution of the aforementioned control programs is larger during vigorous or impatient handling than during gentle or patient handling.

Furthermore, the ROM 53 has stored therein a characteristic map shown in FIG. 9. In this figure, the electric current (Iv) applied to the electromagnetic valve 20 is so determined that it first gradually increases, then does not vary, and finally gradually decreases with increase in the vehicle speed (V) and that it becomes larger as the second driving index (Kv) becomes larger. Therefore, in the case of the second driving index (Kv) becoming large, the electric current (Iv) becomes larger to increase the required steering torque, whereby there can be obtained a steering characteristic which is suitable to vigorous handling. In the case of the second driving index (Kv) becoming small, on the contrary, the electric current (Iv) becomes small to decrease the required steering torque, whereby there can be obtained another steering characteristic which is suitable to gentle handling.

Operation of the above-described assisting power controller 50 will be described hereafter.

The processing steps executed by the CPU 51 are divided, as shown in FIG. 10, roughly into a step (i) for calculating the first driving index (K$\theta$) representing the road condition, another step (ii) for calculating the electric current (I$\theta$) corresponding to the first driving index (K$\theta$), another step (iii) for calculating the second driving index (Kv) representing a handling status, another step (iv) for searching for an electric current (Iv) corresponding to the second driving index (Kv), another step (v) for calculating a total electric current (I) based upon the electric currents (I$\theta$) and (Iv), and a final step (vi) for outputting the total electric current (I). These steps (i) to (vi) are executed in turn as follows:

(i) Calculation of First Driving Index (K$\theta$)

During the vehicle traveling, the steering angle signal ($\theta$) which momentarily varies is detected by the steering angle sensor 40 and is input through the phase discrimination circuit 45 to the reversible counter 46. The vehicle speed (V) is detected by the vehicle speed sensor 48 and is stored in the register (not shown) provided therein.

The aforementioned step (i) is for calculating the first driving index (K$\theta$) based on the detected steering angle signals ($\theta$). Each time the vehicle runs a predetermined distance, the pulse generator (not shown) in the speed sensor 48 inputs an interrupt signal INT to the CPU 51. The CPU 51 executes the steps shown in FIG. 11 in response to the interrupt signal INT. The steering angle signal ($\theta$) stored in the reversible counter 46 is read in step 100 for sampling, and the value (i) of a sampling number counter SNC which is provided in the RAM 52 as shown in FIG. 16 is compared with a set number (N) in step 101. Since right after the driving start, the sampling number is small to hold i<N, the routine is advanced to step 102 to add "1" to the value (i) of the sampling number counter SNC. Step 103 then follows to store the absolute value ($|\theta|$) of the sampled steering angle ($\theta$) at (i)-th address of the RAM 52.

When the sampling number (i) increases to reach the set number (N), the routine is directed from step 101 to step 104, wherein the stored content is refreshed or renewed in such a manner as to shift in turn a value at address M2 to address M1, a value at address M3 to address M2, ..., and finally, to store the absolute value of the newest (i-th) value ($\theta$) to the last address MN. In this situation, the sampling number count value remains to indicate (i=N).

Step 103 and step 104 are followed by step 105, in which a read-out counter ROC of the RAM 52 is set with the sampling number count value (i), and the comparison of the value (MH) at the H-th address with two set values (B and C) is made in step 106. These set values (B and C) respectively represent lower and upper limits of the medium steering angular range (L) (which corresponds to a gentle curve driving) shown in FIGS. 3 and 4. Step 108 is reached if $B \leq MH \leq C$ does not hold in step 106, wile it is reached after the addition of "1" to the value (D) (which is reset each time the program is executed) of a frequency counter FQC of the RAM 52 in step 107 if $B \leq MH \leq C$ holds in step 106. In step 108, "1" is subtracted from the value (H) of the read-out counter ROC. In step 109, the value (H) of the read-out counter ROC is compared with a numeral "0", and the above-noted steps 106–108 are repeatedly executed until the value (H) becomes 0 (zero), so as to move to step 110 upon the confirmation of H=0. The repetition of the above-noted steps 106–108 causes the value (D) in the frequency counter FQC indicates the number of stored values (Mi) each satisfying $B \leq MH \leq C$.

Step 110 then follows to calculate the index (Kθ) based on the following equation.

$$K\theta = D/i$$

The first driving index (Kθ) thus calculated indicates a small value in town street driving because of a small frequency of steering wheel turns within the medium steering angular range (L). Conversely, the index (Kθ) indicates a large value in mountain road driving because of a large frequency of steering wheel turns within the medium steering range (L). As a result, the driving status can be discriminated depending upon the magnitude of the first driving index (Kθ).

(ii) Calculation of Electric Current (Iθ) meeting First Driving Index (Kθ)

Figure 12:
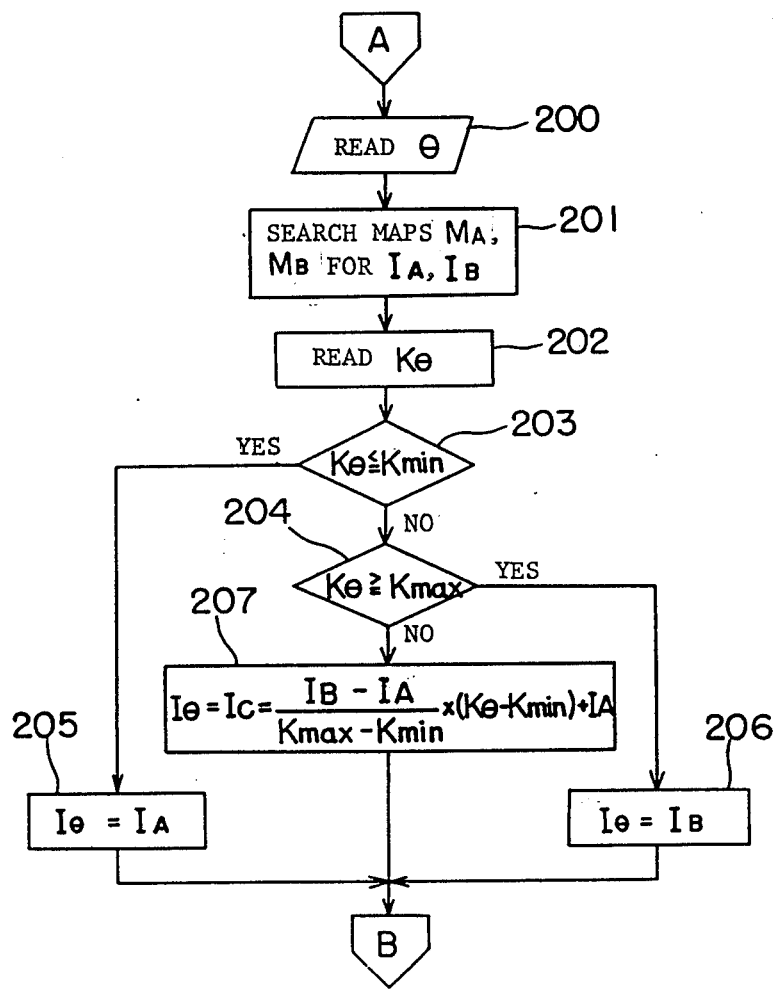
Figure 13:
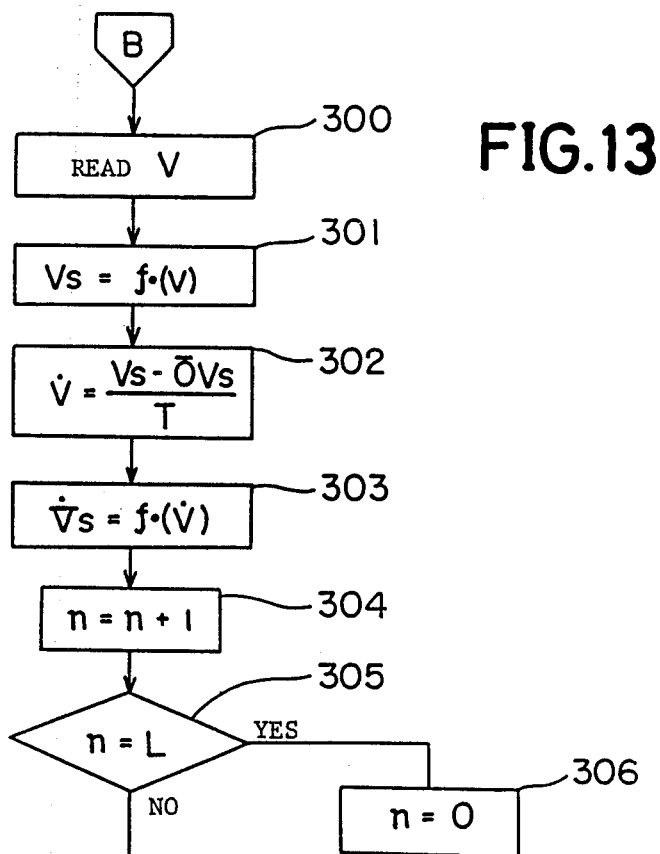

This step (ii) shown in FIG. 12 in detail is to calculate an electric current (Iθ) which meets the first driving index (Kθ). First of all, step 200 for sampling is executed to read a steering angle (θ), and step 201 is then reached to search the two kinds of control patterns MA and MB stored in the ROM 503, for electric currents (IA, IB) meeting the steering angle (θ). The first driving index (Kθ) is read in step 202, and ascertainment is made in step 203 as to whether the first driving index (Kθ) is smaller than, or equal to, the lower limit set value (Kmin) or not and in step 204 as to whether it is larger than, or equal to, the upper limit set value (Kmax) or not. When the index (Kθ) is ascertained to be smaller than, or equal to, the lower limit set value (Kmin), step 205 then follows wherein the electric current (Iθ) is set as IA searched for in step 201. When the index (Kθ) is ascertained to be larger than, or equal to, the upper limit set value (Kmax), step 206 then follows to set the electric current (Iθ) as IB searched for in step 201. However, when the first driving index (Kθ) is ascertained to be between the lower and upper set values (Kmin and Kmax), step 207 then follows wherein the electric current (Iθ) is set as IC which is calculated using the following equation.

$$IC = \frac{IB - IA}{Kmax - Kmin}(K\theta - Kmin) + IA$$

That is, as shown in FIG. 5, the calculated electric current (IC) represents the value (Ix) specified at an intersection that the calculated first driving index (Kθ) (shown as Kx for explanation purpose) makes with a line connecting the electric currents (IA) and (IB) which are specified by the sampled steering angle (θ) in the two kinds of control patterns MA and MB.

As noted from the above-description, in the case of a typical town street driving wherein the first driving index (Kθ) becomes equal to, or smaller than, the lower set value (Kmin), the assisting power is controlled in accordance with the control pattern MA for town street driving. In a typical mountain road driving wherein the first driving index (Kθ) becomes equal to, or larger than, the upper limit set value (Kmax), the assisting power is controlled in accordance with the control pattern MB for mountain road driving. And, in the case where the first driving index (Kθ) is between the lower and upper limit set values (Kmin and Kmax), there is calculated an electric current (IC) meeting the first driving index (Kθ) based upon the intermediate characteristic which can be defined or interpolated by the control patterns MA and MB, and the assisting power is controlled in accordance with the calculated value (IC).

(iii) Calculation of Second Driving Index (Kv)

This step (iii) is to calculate the second driving index (Kv) based upon the vehicle speed (V). The CPU 51, upon completion of the above-noted step (ii), executes the processings for the second driving index (Kv) in accordance with the flow chart shown in FIG. 13.

First of all, the CPU 51 executes step 300 to sample the vehicle speed (V) stored in the register (not shown) of the vehicle speed sensor 48 and then executes step 301 to calculate a modified vehicle speed (Vs) as a result of a modification processing using an equation Vs=f·(V). The modified vehicle speed (Vs) is then differentiated in step 302 for an acceleration ($\dot{V}$), which is then modified in step 303 using an equation $\dot{V}s = f·(\dot{V})$ so as to obtain a modified acceleration ($\dot{V}s$).

Step 304 subsequently follows to add "1" to a speed sampling counter SSC provided in the RAM 52, and the resultant content (n) of the speed sampling counter SSC is compared in step 305 with the number (L) of buffer registers D1–DL provided in the RAM 52. Unless the (n) has not reached (L), step 307 is then reached, wherein the absolute value ($|\dot{V}s|$) of the modified acceleration ($\dot{V}S$) is stored at the n-th one of the buffer registers D1–DL. If n=L, on the contrary, the number (n) is reset to indicate zero in step 306 then to advance step 307. The execution of steps 300–306 enables the CPU 51 to store absolute values ($|\dot{V}s|$) of the modified accelerations ($\dot{V}s$) in turn in a predetermined number (L) of the buffer registers (D1–DL) and to renew the stored content in turn from the first buffer register D1 after all of the buffer registers D1–DL become full.

In the subsequent step 308, the stored data ($|\dot{V}s|$) in all of the buffer registers D1–DL are read out, and the second driving index (Kv) is calculated using the following equation:

$$Kv = \sum_{n=0}^{L} · Dn$$

(iv) Search for Electric Current (Iv) meeting Second Driving Index (Kv)

Figure 14:
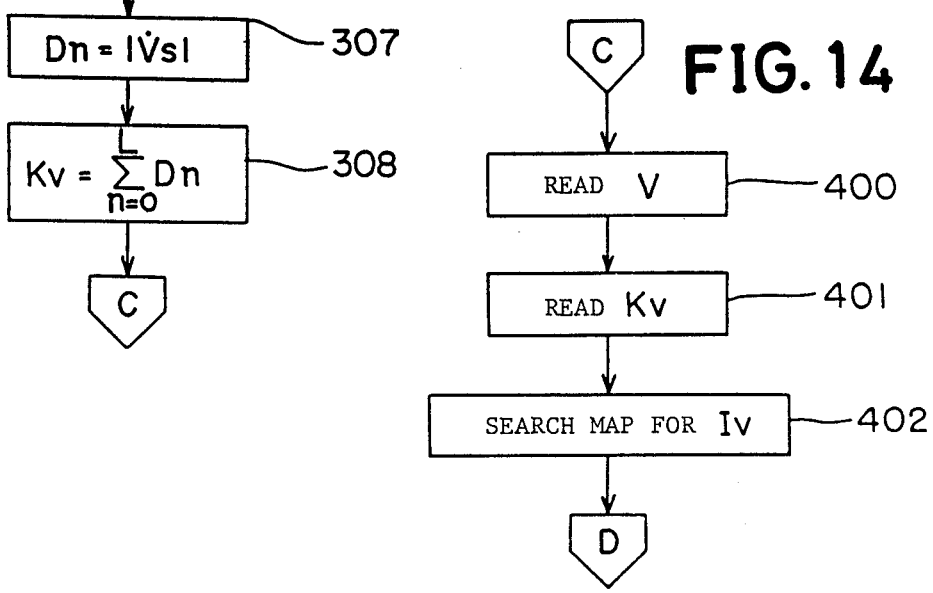

This step (iv) is to search for an electric current (Iv) meeting the second driving index (Kv). As shown in FIG. 14, the CPU 51 reads the vehicle speed (V) stored in the register of vehicle speed sensor 48 in step 400 and in step 401, further reads the second driving index (Kv) which has already been obtained by calculation. The CPU 51 then executes step 402 to search the map shown in FIG. 9 for an electric current (Iv) which meets the read vehicle speed (V) and the second driving index (Kv).

After the executions of the aforementioned steps (i), (ii), (iii) and (iv), the CPU 51 advances to step (v) shown in FIG. 10 to make an addition of the calculated electric currents (Iθ) and (Iv) and then to step (vi) to output the added or total electric current (I) shown in FIG. 15 as the control current to the solenoid drive circuit 61.

The aforementioned electromagnetic flow control valve 20 is supplied at its solenoid 24 with the total electric current (I) which is calculated based upon the first and second driving indexes (Kθ) and (Kv) and causes the power cylinder 12 to generate an assisting power which is controlled by an opening degree of its throttle adjusted depending on the supplied electric current (I). Consequently, when the vehicle runs on mountain road, there is obtained a heavier steering feeling as a result of the road condition being detected as the variation in the first driving index (Kθ). Moreover, the state of maneuver by the driver of the vehicle is added as the variation in the second driving index (Kv) to the power assisting control, whereby during the travel on the same mountain road, there can be obtained a further heavier steering feeling by vigorous maneuver or a relatively lighter steering feeling by gentle maneuver.

Although in the above-described embodiment, the first driving index (Kθ) representing the road condition is calculated based on the ratio of frequencies within respective angular intervals to which the steering wheel is turned, it may otherwise be calculated based on the whole state of variance of steering angles or the average value of steering angles.

Although in the above-described embodiment, the assisting power is controlled by making a bypass of pressurized fluid over the power cylinder 12, there can be taken for such assisting power control various methods of, for example, controlling reaction power, controlling pump-discharged flow volume or the like.

Further, in the above-described embodiment, the vehicle speed sensor 48 drivingly connected to the output shaft 34 of the transmission 31 is used as a means for detecting information relating to the vehicle speed. However, various information which vary with changes in the vehicle speed can be used as the vehicle speed relating information. For example, the vehicle speed relating information can be detected from the engine rotational speed given from an igniter, the opening degree of an engine throttle valve, the air volume to the engine or the like.

In addition, in the above-described embodiment, the value obtained by the addition of absolute values of accelerations is used to detect a certain type of vigorous handling of the vehicle wherein acceleration and deceleration are repeated many times in a short time. The value obtained by such addition is also useful to detect another type of vigorous handling wherein there is made an abrupt large variation in acceleration from a low speed to a high speed or in deceleration adversely, because it varies in response to such an abrupt large acceleration or deceleration.

Obviously, numerous modifications and variations of the present invention may be possible in light of the above teachings. It is therefore to be understood that within the scope of the appended claims, the present invention may be practiced otherwise than as specifically described herein.

What is claimed is:

1. An assisting power controller for a power steering device of a motor vehicle, comprising:

first detection means for detecting the rotational angle of a steering wheel of said motor vehicle so as to output a steering angle signal;

first calculation means for calculating a first driving index based on a plurality of steering angle data obtained by successively sampling said steering angle signal from said first detection means, said first driving index representing the condition of a road on which said motor vehicle travels within a limited time period taken to sample said plurality of steering angle data;

second detection means for detecting information relation to the speed of said motor vehicle;

second calculation means for calculating a second driving index based on a plurality of speed relating data obtained by successively sampling said vehicle speed relating information from said second detection means, said second driving index representing the state of vehicle speed changes made by a driver of said motor vehicle within a limited time period taken to sample said plurality of speed relating data;

control current decision means for deciding a control current based on said first and second driving indexes calculated by said first and second cacluation means; and control means responsive to said control current from said control current decision decision means for controlling the assisting power generated by said power steering device so that the assisting power is varied depending not only on the road condition but also on the state of vehicle speed changes wherein said control current decision means is operable to decide said control current so that the assisting power generated by said power steering device is decreased when said second driving index represents high rate of changes in speed by said operator of said motor vehicle, but is increased when said second driving index represents a low rate of changes in speed of said motor vehicle.

2. An assisting power controller as set forth in claim 1, wherein:

said control current decision means is operable to decide said control current so that the assisting power generated by said power steering device is decreased when said first driving index represents a mountain road driving, but is increased when said first driving index represents a town street driving.

3. An assisting power controller for a power steering device of a motor vehicle, comprising:

first detection means for detecting the rotational angle of a steering wheel of said motor vehicle so as to output a steering angle signal;

first calculation means for calculating a first driving index based on a plurality of steering angle dta obtained by successively sampling said steering angle signal from said first detecting means, said first driving index representing the condition of a road on which said motor vehicle travels;

second detection means for detecting information relating to the speed of said motor vehicle;

second calculation means for calculating a second driving index based on a plurality of speed relating data obtained by successively sampling said vehicle speed relating information from said second detection means, said second driving index representing the state of handling by a driver of said motor vheicle;

control current decision means for deciding a control current based on said first and second driving indexes calculated by said first and second calculation means; and control means responsive to said control current from said control current decision means for controlling the assisting power generated by said power steering device;

wherein said control current decision means comprises:

first decision means for deciding a first electric current based on a steering angle signal from said first detection means and said first driving index calculated by said first calculation means;

second decision means for deciding a second electric current based on a vehicle speed relating information from said second detection means and said second driving index calculated by said second calculation means; and third decision means responsive to said first and second electric currents from said first and second decision means for making said control current therefrom to be applied to said control means.

4. An assisting power controller as set forth in claim 3, wherein said first decision means comprises:

reading means for reading said steering angle signal from said first detection means and said first driving index calculated by said first calculation means at a predetermined interval;

map storage means for storing at least two characteristic maps each defining various first electric currents in connection with various steering angles, said at least two characteristic maps being different in variation characteristic of said first electric currents to said steering angles; and search means for searching said at least two characteristic maps for said first electric current by reference to said steering angle signal and said first driving index read by said reading means.

5. An assisting power controller as set forth in claim 4, wherein said first decision means further comprises:

ascertaining means for ascertaining whether said first driving index read by said reading means is between upper and lower limits or not; and calculation means operable when said first driving index is ascertained by said ascertaining means to be between said upper and lower limits, for calculating said first electric current based on said at least two characteristic maps and a predetermined equation.

6. An assisting power controller as set forth in claim 3, wherein said second decision means comprises:

reading means for reading speed relating information from said second detection means and said second driving index calculated by said second calculation means at a predetermined interval;

map storage means for storing a characteristic map defining various second electric currents in connection with various speed relating information; and search means responsive to said speed relating information and said second driving index read by said reading means for searching said characteristic map for said second electric current.

7. An assisting power controller as set forth in claim 3, wherein said first calculation means comprises:

sampling means for reading said steering angle signal from said first detection means at a predetermined interval;

data storage means for storing said plurality of steering angle data sampled by said sampling means, in such a manner as to renew the stored steering angle data for those latest;

selection means for selecting from said plurality of steering angle data stored in said data storage means those which are between upper and lower limits; and index calculation means for calculating said first driving index based on said those steering angle data selected by said selection means.

8. An assisting power controller as set forth in claim 3, wherein said second calculation means comprises:

sampling means for reading said speed relating information from said second detection means at a predetermined interval;

acceleration calculation means for calculating an acceleration based on said speed relating information sampled by said sampling means;

data storage means for storing a plurality of absolute values of accelerations each circulated by said acceleration calculation means; and integration means for integrating said plurality of absolute values of accelerations to obtain said second driving index.

9. An assisting power controller as set forth in claim 3, wherein:

said control current decision means is operable to decide said control current so that the assisting power generated by said power steering device is decreased when said second driving index represents vigorous handling by said driver of said motor vehicle, but is increased when said second driving index represents gentle handling of said motor vehicle.

10. An assisting power controller as set forth in claim 9, wherein:

said control current decision means is operable to decide said control current so that the assisting power generated by said power steering device is decreased when said first driving index represents a mountain road driving, but is increased when said first driving index represents a town street driving.

11. An assisting power controller for a power steering device of a motor vehicle, comprising:

first detection means for detecting the rotational angle of a steering wheel of said motor vehicle so as to output a steering signal;

first calculation means for calculating a first driving index based on a plurality of steering angle data obtained by successively sampling said steering angle signal from said first detection means, said first driving index representing the condition of a rod on which said motor vehicle travels;

second detection means for detecting information relating to the speed of said motor vehicle;

second calulation means for calculating a second driving index based on a plurality of speed relating data obtained by successively sampling said vehicle speed relating information from said second detection means, said second driving index representing the state of handling by a driver of said motor vehicle;

control current decision means for deciding a control current based on said first and second driving indexes calculated by said first and second calculation means; and control means responsive to said control current from said control current decision means for controlling the assisting power generated by said power steering device;

wherein said first calculation means comprises:

sampling means for reading said steering angle signal from said first detection means at a predetermined interval;

data storage means for storing said plurality of steering angle data sampled by said sampling means, in such a manner as to renew the stored steering angle data for those latest;

selection means for selecting from said plurality of steering angle data stored in said data storage means those which are between upper and lower limits; and index calculation means for calculating said first driving index based on said those steering angle data selecting by said selection means.

12. An assisting power controller as set forth in claim 11, wherein said index calculation means is operable to calculate said first driving index by dividing the number of said those steering angle data by the number of said plurality of steering angle data stored in said data storage means.

13. An assisting power controller for a power steering device of a motor vehicle, comprising:

first detection means for detecting the rotational angle of a steering wheel of said motor vehicle so as to output a steering angle signal;

first calculation means for calculating a first driving index based on a plurality of steering angle data obtained by successively sampling said steering angle signal from said first detection means, said first driving index representing the condition of a road on which said motor vehicle travels;

second detection means for detecting information relating to the speed of said motor vehicle;

second calculation means for calculating a second driving index based on a plurality of speed relating data obtained by successively sampling said vehicle speed relating information from said second detection means, said second driving index representing the state of handling by a driver of said motor vehicle;

control current decision means for deciding a control current based on said first and second driving indexes calculated by said first and second calculation means; and control means responsive to said control current from said control current decision means for controlling the assisting power generated by said power steering device;

wherein said second calculation means comprises:

sampling means for reading said speed relating information from said second detection means at a predetermined interval;

acceleration calculation means for calculating an acceleration based on said speed relating information sampled by said sampling means;

data storage means for storing a plurality of absolute values of accelerations each calculated by said acceleration calculation means; and integration means for integrating said plurality of absolute values of accelerations to obtain said second driving index.

14. An assisting power controller for a power steering device of a motor vehicle, comprising:

first detection means for detecting the rotational angle of a steering wheel of said motor vehicle so as to output a steering angle signal;

first calculation means for calculating a first driving index based on a plurality of steering angle data obtained by successively sampling said steering angle signal from said first detection means, said first driving index representing the condition of a road on which said motor vehicle travels;

second detection means for detecting information relating to the speed of said motor vehicle;

second calculation means for calculating a second driving index based on a plurality of speed relating data obtained by successively sampling said vehicle speed relating information from said second detection means, said second driving index representing the state of handling by a driver of said motor vehicle;

control current devision means for deciding a control current based on said first and second driving indexes calculated by said first and second calculation means; and control means responsive to said control current from said control current decision means for controlling the assisting power generated by said power steering device;

wherein:

said control current decision meaens is operable to decide said control current so that the assisting power generated by said power steering device is decreased when said second driving index represents a high rate of change in speed by said driver of said motor vehicle, but is increased when said second driving index represents low rate of changes in speed of said motor vehicle.

* * * * *